3,591,673
METHOD FOR MELT-SPINNING FIBERS REIN-FORCED WITH PARTICLES OF POLY(1,4-BENZAMIDE)
Harold Pollack, Claymont, Del., assignor to E. I. du Pont de Nemours and Company, Wilmington, Del.
No Drawing. Filed July 24, 1968, Ser. No. 747,111
Int. Cl. B28b *3/20*
U.S. Cl. 264—176           7 Claims

ABSTRACT OF THE DISCLOSURE

A method for melt spinning fibers reinforced with particles of poly(1,4-benzamide) of specific characteristics. The solid reinforcing polymer is dispersed in a melt of the matrix polymer, the melt is extruded and the resulting fibers are drawn.

---

This invention pertains to fibers comprising two immiscible polymers and more particularly to a method for preparing reinforced fibers exhibiting high levels of tensile properties and which resist growth and creep at elevated temperatures.

BACKGROUND OF THE INVENTION

It is well known that one is able to increase the tensile properties of fibers formed from melts or solutions of synthetic organic polymers by incorporating particles of synthetic organic polymers or inorganic material that are immiscible with the matrix polymer. A reinforcing agent should exhibit high modulus in addition to good adhesion to the matrix material. Organic polymers commonly employed for reinforcement applications usually exhibit adequate adhesion, but lack the high modulus and creep resistance that characterize glass, metal and refractory oxides. In the absence of an additional adhesive or coupling agent, the high tensile properties of inorganic materials are often not transmitted to the composite structure because of poor adhesion between reinforcing agent and matrix. Fibers containing these materials cannot be drawn to any appreciable extent without void formation resulting from inadequate bonding between reinforcing agent and matrix. The resulting loss of tensile properties often more than offsets the increase which would be obtained by drawing the unreinforced matrix polymer. Moreover, inorganic materials capable of providing tensile reinforcement are not compatible with conventional spinning apparatus, since they often impede the continuous flow of polymer of concentrations where they would begin to appreciably increase the tensile properties of the composite fiber.

SUMMARY OF THE INVENTION

The present invention concerns a novel method for producing reinforced fibers, said process comprising uniformly dispersing solid acicular oriented particles of poly(1,4-benzamide), in a melt of a melt-spinnable synthetic linear fiber-forming matrix polymer, preferably chosen from the group comprising polyamides and polyesters. The molten mixture is then extruded through at least one spinneret orifice and the resulting fiber drawn at an elevated temperature below the melting point of the matrix polymer. The particles are composed of poly(1,4-benzamide) characterized by recurring units of the formula:

(I) 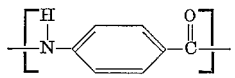

having an inherent viscosity of between 0.8 and 1.8, measured as described hereinafter, and a peak height ratio below 0.86. The particles exhibit lengths (the largest dimension) up to 10 microns and widths (the next largest dimension) of up to 4 microns, with the further proviso that the L/W ratio is greater than 2/1. The orientation angle ($2\theta_D$) of the particles, determined as described hereinafter, is less than about 45°. The angular variation ($2\alpha$) for minimum transmittance of polarized light, determined as described hereinafter, is in the range between 5° and 20°.

DETAILED DESCRIPTION OF THE INVENTION

(A) Poly(1,4-benzamide) preparation

Poly(1,4-benzamide), hereinafter referred to as the reinforcing polymer, is conveniently prepared from the amine hydrochloride of p-aminobenzoyl chloride

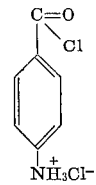

This monomer is polymerized in solution, N,N,N',N'-tetramethyl urea (TMU) being a preferred solvent. The solution containing the monomer is stirred rapidly at ambient temperature for about two hours to obtain substantially complete polymerization. The molecular weight is controlled by the addition of about 2 mole percent, based on monomer, of p-aminobenzoic acid, which acts as a chain-stopping agent and is added during the early stages of polymerization. The amount of acid required will vary inversely with the amount of impurities which act to decrease the degree of polymerization. The hydrogen chloride generated during the reaction is neutralized using two equivalents of a suitable alkaline salt for each mole of polymer. Lithium carbonate is preferred for this purpose, since the lithium chloride resulting from neutralization dissolves and, together with the TMU, forms a preferred solvent for the polymer. The water resulting from neutralization adversely affects the stability of some polymer melts and should be removed by distillation at about 120° C. and under reduced pressure.

(B) Acicular particle preparation

The reinforcing particles, having the aforesaid properties, used in the process of this invention, are prepared by the precipitation of poly(1,4-benzamide) under specified conditions. The process comprises preparing a composition containing from about 3 to 6 weight percent of poly(1,4-benzamide) (based on the total weight of the composition), is an amide or urea medium, such as N,N,N',N'-tetramethylurea (TMU) or N,N-dimethylacetamide (DMAc) containing between about 1 and 8 moles of lithium chloride for each mole of polymer. Optionally, the composition may also contain from about 2 to 16 moles of N,N-dimethylformamide (DMF) for each mole of polymer. A non-solvent for the polymer having a dielectric constant less than about 15 at 20° C. which is miscible in the amide or urea medium, such as carbon tetrachloride, chloroform or benzene, is added under conditions designed to precipitate the particles, preferably as discrete entities.

Particles of the required characteristics can be obtained by dissolving the reinforcing polymer, prepared as described hereinabove, in a 47:47:6 weight ratio mixture of TMU:N,N-dimethylformamide (DMF):lithium chloride to form about a 5% by weight solution. The solution is then diluted to about 1.4 times its original volume with carbon tetrachloride ($CCl_4$), which is insufficient to precipitate the polymer, after which it is subjected to low shear by stirring while carbon tetrachloride is slowly added to precipitate the polymer in particulate form. Particle size and shape are a function of the average shear rate, the quantity of lithium chloride present and the relative amounts of TMU and DMF. The precipitant is preferably added to the reaction mixture as a gas to avoid both agglomeration of the particles and spherulitic crystals resulting from two or more particles being generated at a single nucleation site.

A suitable shear rate is provided by a ribbon-shaped stirrer rotating at a speed of 60 r.p.m. in a 2-liter resin flask containing 500–1000 cc. of solution. Too high a shear rate will cause the particles to assume a highly branched configuration which will not readily pass through conventional sand packs and spinneret orifices.

If the monomer contains significant amounts of impurities which act as chain-stopping agents, a relatively large fraction of low molecular weight material may be present, which will precipitate as an oil or a semi-solid, even though the average inherent viscosity of the polymer is above the 0.8 value specified hereinbefore. To avoid interparticle adhesion by this low molecular weight fraction, precipitation should be stopped before any of the latter material comes out of solution.

The particles of reinforcing polymer are washed successively with a 66/33/1% by weight mixture of $CCl_4$/DMF/LiCl, ethyl alcohol and water in that order to remove a major portion of the lithium chloride.

(C) Matrix polymer

The matrix polymer is a melt-spinnable synthetic linear fiber-forming polymer. Illustrative of the various preferred polymers which may be used are the polyamides, such as poly(hexamethylene adipamide) and poly(epsiloncaprolactam), polyesters such as poly(ethylene terephthalate), copolyesters derived from ethylene glycol, terephthalic acid and up to 15 mol percent of some other dibasic acid, cellulose triacetate and other meltable cellulose derivatives, and plasticized melt-spinnable poly(acrylonitrile) or copolymers containing at least 85% acrylonitrile. The most preferred matrix polymers are the polyamides such as those listed in U.S. Pats. Nos. 2,071,250, 2,071,251, 2,071,253, 2,130,523, 2,130,948, 2,190,770, 2,252,555, 2,252,557 and 2,374,137. Among these polyamides, poly(hexamethylene adipamide) is most preferred. However, as long as the matrix polymer is fiber-forming and melt-spinnable it is suitable for use in this invention. Polyamides having an inherent viscosity greater than about 0.4, as measured in a 90% by weight aqueous solution of formic acid, are generally fiber-forming and melt-spinnable. Polyesters having an inherent viscosity greater than about 0.35, as measured in a 4:6 weight ratio mixture of 1,1,2,2-tetrachloroethane:phenol, are generally fiber-forming and melt-spinnable. Inherent viscosity is measured as described hereinafter.

(D) Reinforcing/matrix polymer compositions

Polymer compositions suitable for spinning into filaments are preferably prepared by dispersing up to 10% by weight of reinforcing polymer particles throughout a melt of the matrix polymer. This can be accomplished by using any one of the numerous types of apparatus known in the art which will produce a uniform distribution of small solid particles in a polymer melt. Care should be taken to obtain a homogeneous mixture, since this is a necessary condition for achieving the high tensile properties that characterize the present reinforced filaments.

Although up to 10% by weight of the reinforcing polymer is preferred, composition containing up to 15% by weight or even higher may be extruded into useful fibers. However, reinforcing polymer addition in excess of 10% by weight generally reduces the drawability of the fiber. Since drawing significantly improves the tensile properties of the fiber, it is preferred to maintain the same drawability which is characteristic of the unreinforced fiber. For example, unreinforced poly(hexamethylene adipamide) is normally drawn 5× (500% of its as-extruded length) to improve the fiber's tensile properties. When up to 10% by weight of reinforcing polymer is incorporated into this matrix polymer, a 5× draw is still attainable.

It is important that the reinforcing polymer be in the physical form previously described (i.e., solid particles having a maximum dimension of less than about 10 microns and an $L/W$ ratio of greater than about 2/1). If the reinforcing polymer is in a different physical form (e.g., plasticized quidimensional particles), it has been found that interruptions in the spinning operation are more likely to occur and the initial modulus of the reinforced fiber is lower when compared to fibers prepared using reinforcing polymer of the physical form previously described.

(E) Fiber preparation

The molten reinforcing/matrix polymer composition is extruded through at least one spinneret orifice and the resulting fiber is drawn at an elevated temperature which is below the melting point of the matrix polymer.

The compositions described hereinabove are extruded into fibers using conventional melt-spinning techniques and apparatus. Under the pressures required to extrude some compositions, many of the sand filtering packs employed in spinneret assemblies may undergo a gradual decrease in porosity sufficient to obstruct the passage of the solid particles, eventually blocking the flow of polymer to the spinneret. This difficulty can generally be avoided by replacing the sand with tabular alumina that exhibits a particle size of between 300 and 600 microns.

As previously discussed, it is preferred to draw the extruded reinforced fiber to the same extent preferred for the unreinforced fiber. For example, a 5× draw is preferred for poly(hexamethylene adipamide) and poly(ethylene terephthalate) as unreinforced fibers. These fibers, containing up to 10% by weight of the reinforcing polymer, are also preferably drawn 5×.

The draw temperature should be below the melting point of the matrix polymer. Generally, the temperature should be about 20° to 30° C. below the melting point to minimize the polymer sticking to the draw rolls, etc. Elevated drawing temperatures (i.e., above room temperature) are generally required for optimum fiber properties. For poly(hexamethylene adipamide) (melting point about 250° C.), the preferred draw temperature is between about 180° and 220° C.

As is well understood, the draw temperature refers to the temperature of the fibers being drawn. The temperature of the zone in which these fibers are heated may be considerably higher as determined by the heat transfer condition (e.g., fiber residence time).

(F) Reinforced fibers

Fibers containing a uniform distribution of reinforcing polymer particles exhibit levels of modulus and resistance to growth and creep that are markedly higher than have been observed using filaments of similar compositions and orientation in which the reinforcing polymer is absent. The present reinforced fibers are eminently suitable for reinforcement applications requiring dimensional stability at elevated temperatures. Examples of such applications are tire cord and reinforcement fibers for V-belts. The practical significance of improved resistance to growth and creep in these and other end uses is seen in the fiber's improved ability to uniformly retain its length. When unreinforced polyamide fibers are incorporated into V-belts, the heat imparted to the fibers in use causes the belt to "sag," requiring readjustment or replacement of the belt. Similarly, in tire manufacture, the tire cord is subjected to varying temperatures along its length while the elastomer surrounding it is being cured. These variations in temperature tend to cause unequal degrees of cord elongation throughout the tire, resulting in a non-uniform product. These, and similar difficulties are significantly reduced by the present invention.

MEASUREMENTS AND TESTS

Optical path difference (O.P.D.) and angular variation ($2\alpha$)

The optical path difference (O.P.D.) of light vibrating parallel and perpendicular to the longitudinal particle axis is measured with white light and a polarizing microscope equipped with a three order Berek compensator. The sample is mounted in an oil exhibiting a refractive index of 1.63.

The angle between the analyzer (or polarizer) of the microscope and the longitudinal axis of the particle at which minimum light transmittance occurs is observed at various areas throughout the particle. The number of degrees over which minimum transmittance occurs for a given particle is reported as the angular variation ($2\alpha$).

Particle dimensions: Particle dimensions greater than about 0.2 microns, are measured using an optical microscope. The thickness of a given particle ($T_p$), in microns, is calculated using Equation 1.

(1) $$T_p = \frac{O.P.D.}{\Delta p}$$

O.P.D.=optical path difference in microns
$\Delta p$=birefringence of particle

The O.P.D. is measured as previously described. The birefringence ($\Delta p$) of the particle is in turn calculated using Herman's equation (Equation 2).

(2) $$\Delta p = t(1 - 3/2 \sin^2 \theta_p)$$

$\Delta t$=birefringence of a perfectly ordered polymer sample
$\theta_p$=one-half the value of the orientation angle ($2\theta_p$) of the particle.

Angle $\theta_p$ is obtained, as described hereinafter, from the electron diffraction pattern of the particle.

Theoretical birefringence ($\Delta t$) of a perfectly ordered polymer sample is obtained using the following equation (Equation 3), (3) $$\Delta t = \Delta_f / (1 - 3/2 \sin^2 \theta_f)$$

wherein $\Delta_f$ and $\theta_f$ represent the birefringence (measured using an interference microscope) and one-half the orientation angle (measured using X-ray diffraction), respectively, of a crystallized filament prepared from poly(1,4-benzamide). The filament is crystallized by heating it at about 540° C. for about 6 seconds. The polymer is prepared as described in the preceding specification.

Inherent viscosity: Inherent viscosity ($\eta_{inh}$) is determined in accordance with the following equation:

$$\eta_{inh} = \frac{\ln(\eta_{rel})}{C}$$

wherein ($\eta_{rel}$) represents the relative viscosity and (C) represents the weight in gram(s) of the polymer in 100 ml. of the solvent. The relative viscosity ($\eta_{rel}$) is determined by dividing the flow time in a capillary viscometer of a dilute solution of the polymer by the flow time for the pure solvent. Unless otherwise specified, the dilute solutions used herein for determining ($\eta_{rel}$) have C equal to 0.5 and flow times are determined at 30° C. The solvent employed for poly(1,4-benzamide) is concentrated (95–98%) sulfuric acid. The solvents employed for the various matrix polymers are specified in the following examples.

Peak height ratio: A measure of the relative intensity of the two major equatorial diffraction peaks is given by the peak height ratio (PHR). A suitable method for determining the PHR involves the use of a reflection technique to record the intensity trace of the X-ray diffraction pattern with an X-ray diffractometer. Approximately 0.5 gram of water- and amide- or urea-free polymer is pressed into a sample holder under an applied pressure of 3,125 lb./in.$^2$ (219.8 × 10$^3$ g./cm.$^2$). Using CuK$\alpha$ radiation, a trace of the intensity is recorded from 6° to 40°, $2\theta$, and with 0.5° slits, at a scanning speed of 1°, $2\theta$, per minute, a chart speed of 1 inch (2.54 cm.) per minute, and a time constant of 2; $2\theta$, being the angle between the undiffracted beam and the diffracted beam. The full scale deflection of the recorder is set so that the peak with maximum intensity is at least 50% of the scale, which is a linear scale. To calculate the PHR, a base line is first established on the diffractometer scan by drawing a straight line between the points on the curve at 8° and 28°, $2\theta$. Vertical lines (at constant $2\theta$ values) are drawn from the peaks in the vicinity of 20.3° and 23.4°, $2\theta$, to the base line, and the height of the peaks, in chart divisions, above the base line is ascertained. The PHR is then calculated from the equation $$PHR = \frac{A}{B}$$

where $A$=height of the peak, approximately located at 20.3°, $2\theta$, above the base line in chart division, $B$=height of the peak, approximately located at 23.4°, $2\theta$ above the base line in chart divisions.

Orientation angle: The orientation angle ($2\theta_p$) of the poly(1,4-benzamide) particles are reported as the angle between half-maximum intensity points on the equatorial reflection of the electron diffraction pattern. All values listed represent an average obtained using four particles.

Solubility test: To a solution of 1.0 g. of dry lithium chloride in 30 ml. of dry N,N-dimethylacetamide is added 0.5 g. of dry poly(1,4-benzamide) polymer comminuted to a particle size of about 1 to 5$\mu$. The tube is stoppered and its contents, heated at 60–80° C., are subjected to stirring by a mechanical agitator for a period of from 10 min. to 4–5 hrs. If polymer particles remain visible, the contents of the tube are cooled to −70° C. (e.g., by immersion in a bath of solid carbon dioxide and acetone), then are allowed to warm up until stirring can be resumed, and are heated as above. The tube is then allowed to stand upright for a further 24 hours without stirring. After this time, no polymer residue lies settled on the bottom of the tube.

Fiber tensile properties

Fiber properties of tenacity, elongation, and initial modulus, are coded as T/E/Ni, and are reported in their conventional units, grams/denier, percent, grams/denier, respectively. Denier is coded as Den.

Creep and growth: "Creep" and "growth" are determined by placing a loop of 800 denier yarn in a chamber at 160° C. under dry conditions (substantially 0% relative humidity). The circumference of the loop is 20 inches (50 cm.) at ambient temperature and humidity. The length of the loop is then measured under a load of 0.1 g./denier (equivalent to 16 g.) which is sufficient to convert it to substantially a one-dimensional structure. With one end of the structure secured, a 1600-gram load is attached to the lower end of the loop and the yarn allowed to elongate. The amount of elongation is measured 30 seconds after loading and the measurement is repeated 29.5 minutes later. "Growth" is defined as the relative amount by which the loop elongated during the total 30 minutes, the elongation during the 29.5 minute period is referred to as "creep."

EXAMPLES

The invention will be further illustrated by the following non-limiting examples. Parts and percentages are by weight unless otherwise indicated.

Example I

Poly(1,4-benzamide) particles (2 grams) having a maximum dimension of less than 5 microns and an $L/W$ of about 5/1 and powdered poly(hexamethylene adipamide) (38 grams) are combined with 750 cc. water. The poly(1,4-benzamide) has an inherent viscosity of greater than about 0.8 and is end-capped using p-aminobenzoic acid; the poly(hexamethylene adipamide) has an inherent viscosity of 0.9 in a 90% by weight aqueous solution of formic acid at 30° C. calculated as defined in the preceding specification. The blend is dried in a vacuum oven at 100° C., and then molded into a 0.875 inch 2.2 cm.)-diameter plug which is subsequently melted and extruded through an 0.01 inch (0.025 cm.)-diameter spinneret orifice. The spinneret temperature is 270° C. and the spinning pressure is 3200 p.s.i.g. ($225 \times 10^3$ g./cm.$^2$). The as-spun fiber is wound up at a speed of 41 ft./min. (12 meters/minute) and drawn 5× over a hot plate at 205° C.

Example II

A reinforced filament is prepared using the procedure and polymers described in Example I, 36 grams of poly(hexamethylene adipamide) and 4 grams of poly(1,4-benzamide) are employed. The melt is filtered using a 28–49 mesh tabular alumina pack located upstream from the spinneret. The spinneret temperature is 294° C. and the spinning pressure is 2640 p.s.i.g. ($186 \times 10^3$ g./cm.$^2$). The as-spun fiber is wound up at a speed of 23 ft./min. (6.9 meters/min.) and drawn 5× over a hot plate at 210° C.

Example III

A polymer blend similar to that described in Example I is prepared using 1500 cc. of perchloroethylene as the liquid vehicle, 429.3 grams of poly(hexamethylene adipamide) and 47.7 grams of poly(1,4-benzamide) are employed. The blend is then dried in a vacuum oven at 160° C., melted and extruded as a ribbon which is cut into flakes approximately 0.25 in. x 0.25 in. x 0.063 in. (0.64 cm. x 0.64 cm. x 0.16 cm.).

The polymer flake is melted in a one in. (2.5 cm.)-diameter screw melter and the molten polymer pumped to a cylindrical homogenizer equipped with a number of stirring paddles connected to a rotating central shaft. The clearance between the paddles and the inner wall is sufficiently close to obtain a hold-up time within the unit of about 30 minutes. The homogenizer is heated to a temperature of 290° C. From the homogenizer the molten polymer passes through a 40-mesh sand pack that is located upstream from a 0.039 in. (0.099 cm.)-diameter spinneret orifice. The spinneret temperature is 295° C. and the spinning pressure is 150 p.s.i.g. ($105 \times 10^2$ g./cm.$^2$). The as-spun fiber is wound up at a rate of 1500 ft./min. (460 meters/min.) and drawn 5× over a hot plate at 210° C.

Example IV

The poly(1,4-benzamide) particles (40 grams) similar to those described in Example I are dispersed in 400 cc. water and deflocculated by the addition of trisodium phosphate (0.3 weight percent based on polymer). The slurry is combined with poly(hexamethylene adipamide) particles (490 grams) in water and dried in a vacuum oven at 100° C. The sample is then molded into flakes and homogenized as described in Example III. Prior to being spun through a spinneret having 3 holes, 0.019 in. (0.048 cm.) in diameter, the melt is filtered through 40 mesh sand. The spinneret temperature is 285° C. and the spinning pressure is 500 p.s.i.g. ($35 \times 10^3$ g./cm.$^2$). The as-spun fiber is wound up at a speed of 1575 ft./min. (480 meters/min.) and drawn 5× over a hot plate at 210° C.

Unreinforced poly(hexamethylene adipamide) is molded into a 0.875 in. (2.2 cm.)-diameter plug which is subsequently melted and extruded through a .01 in. (0.025 cm.)-diameter spinneret orifice. The spinneret temperature is 270° C. and the pressure is 8000 p.s.i.g. ($560 \times 10^3$ g./cm.$^2$). A sand pack is used as a filter. The fiber is wound up at a speed of 227 ft./min. (68 meters/min.) and is drawn 5× over a hot plate at 200° C. This fiber is employed as a control, designated IV–C–1. Another control fiber is prepared under similar conditions except that it is drawn about 5.5×; this fiber is designated IV–C–2.

Example V

A polymer composition is prepared by combining 4 grams of poly(1,4-benzamide) particles similar to those described in Example I with 36 grams of poly(ethylene terephthalate) in 750 cc. of water. A solution of the polyester in a 6/4 weight ratio mixture of 1,1,2,2-tetrachloroethane/phenol exhibits an inherent viscosity of 1.1. After drying in a vacuum oven at 100° C. the blend is molded into a 0.875 in. (2.2 cm.)-diameter plug which is melt spun using the apparatus described in Example II. The spinneret temperature is 284° C. and the spinning pressure is 2560 p.s.i.g. ($180 \times 10^3$ g./cm.$^2$). A temperature of 290° C. is maintained for about 3 inches (7.62 cm.) below the spinneret. The as-spun filament is wound up at a speed of 166 ft./min. (50.6 meters/min.) and drawn 5.4× across a hot plate at 100° C.

Unreinforced poly(ethylene terephthalate) is similarly molded, extruded and drawn into fiber. This fiber is employed as a control, designated V–C.

Table I lists significant properties of the reinforced fibers prepared in the preceding examples. Of particular significance is the higher resistance to growth and creep as well as the higher modulus of the fibers of this invention as compared to the control (non-reinforced) fibers. The average length and width of the poly(1,4-benzamide) particles, expressed in microns, are represented by L and W, respectively.

Example VI–C

The example illustrates the melt spinning of poly(hexamethylene adipamide) containing poly(1,4-benzamide) not in the form of particles of this invention.

One hundred seventy-eight grams of poly(hexamethylene adipamide) powder of about +60 mesh is combined with 183 grams of a dope of poly(1,4-benzamide) in N-methylpyrrolidone/lithium chloride (NMP/LiCl) to provide a 97.5/2.5 wt. percent blend of poly(hexamethylene adipamide)/poly(1,4-benzamide) polymers. The dope is prepared by stirring 2.5 wt. percent of poly(1,4-benzamide) ($\eta_{inh}=0.99$) into NMP/LiCl (95/5 wt. percent), cooling with Dry Ice for two hours and then heating to 100° C. for two hours with stirring. This mixture of blended polymers is heated on a hot plate (150° C.) to remove sufficient solvent and yields a tacky mixture which is then pressed into a plug using a mold temperature of 130° C. This plug is press spun at a spinneret temperature of 224° C. using a pressure of 6400 p.s.i. to yield continuous monofilaments. These filaments after being exposed to the atmosphere for about 4 weeks are drawn 4.5× on a 200° C. hot plate. The as-drawn filaments exhibit an average denier of 14.5; the average tensile properties are shown in Table I. The tensile properties, especially the initial modulus, of these filaments are significantly lower than those of the reinforced filaments prepared according to this invention.

TABLE I

| Example | Matrix polymer,[1] weight percent | Reinforcing [2] polymer Weight percent | L, microns | W, microns | Tenacity, g./denier | Elongation, percent | Modulus, g./denier | Growth, percent at 160° C. | Creep, percent at 160° C. |
|---|---|---|---|---|---|---|---|---|---|
| I | 95 | 5 | 5 | 1 | 8.0 | 16 | 43 | | |
| II | 90 | 10 | 3 | 1 | 8.6 | 13 | 48 | 2.04 | 0.27 |
| III | 90 | 10 | 2 | 1 | 6.0 | 14 | 51 | 4.27 | 0.53 |
| IV | 92.5 | 7.5 | 2 | 1 | 6.8 | 15 | 45 | 3.15 | 0.39 |
| IV-C-1 | 100 | | | | 7.0 | 18 | 37 | 7.7 | 0.9 |
| IV-C-2 | 100 | | | | 7.5 | 16 | 41 | 5.0 | 0.65 |
| V | 90 | 10 | 3 | 1 | 4.5 | 16 | 113 | | |
| V-C | 100 | | | | 4.1 | 21 | 99 | | |
| VI-C | 97.8 | 2.2 | | | 4.2 | 12.8 | 29 | | |

[1] Poly(hexamethylene adipamide) for Examples I–IV-C; poly(ethylene terephthalate) for Examples V and V-C.
[2] Poly(1,4-benzamide).

What is claimed is:
1. Method for producing reinforced fibers comprising:
  (1) dispersing solid poly(1,4-benzamide) particles in a melt of a melt-spinnable synthetic linear fiber-forming matrix polymer,
    said poly(1,4-benzamide) particles characterized by:
      (a) a length (L) of up to 10 microns,
      (b) a width of (W) of up to 4 microns,
      (c) a length of width ratio (L/W) of greater than 2/1.
      (d) an average orientation angle ($2\theta_p$) of less than 45°, and
      (e) an angular variation ($2\alpha$) for minimum polarized light transmittance of between 5° and 20°
    said poly(1,4-benzamide) having:
      (f) an inherent viscosity of between about 0.8 and 1.8 as measured in a solution of 0.5 g. poly(1,4-benzamide) in 100 cc. of concentrated (95–98%) sulfuric acid at 30° C.,
  (2) extruding the resulting melt having the particles dispersed therein through a spinneret to form fibers thereof, and
  (3) drawing said fiber at an elevated temperature below the melting point of said matrix polymer.
2. Method of claim 1 wherein up to about 10% by weight of said particles are dispersed in the said melt and are uniformly dispersed therein.
3. Method of claim 2 wherein said matrix polymer is selected from the group consisting of polyamides and polyesters.
4. Method of claim 2 wherein said matrix polymer is poly(hexamethylene adipamide).
5. Method of claim 2 wherein said matrix polymer is poly(ethylene terephthalate).
6. Method of claim 3 wherein said drawing is about 5×.
7. Method of claim 4 wherein said drawing is about 5× at a temperature from about 180° to 220° C.

References Cited

UNITED STATES PATENTS

| | | | |
|---|---|---|---|
| 3,329,557 | 7/1967 | Magot et al. | 161—172 |
| 3,225,011 | 12/1965 | Preston | 260—78A |
| 3,234,313 | 2/1966 | Miller et al. | 264—230 |
| 3,329,557 | 7/1967 | Magot et al. | 161—172 |
| 3,369,057 | 2/1968 | Twilley | 260—857 |
| 3,382,305 | 5/1968 | Breen | 264—171 |
| 3,386,967 | 6/1968 | Twilley | 260—857 |
| 3,419,636 | 12/1968 | Pietrusza et al. | 260—857 |
| 3,470,686 | 10/1969 | Fleming et al. | 57—140 |
| 3,472,819 | 10/1969 | Stephens | 260—78 |
| 3,475,898 | 11/1969 | Magot et al. | 161—180 |

JAY H. WOO, Primary Examiner

U.S. Cl. X.R.

264—210, 290, 349; 260—78, 857